United States Patent
Corvin

(10) Patent No.: US 9,137,491 B2
(45) Date of Patent: Sep. 15, 2015

(54) METHODS AND SYSTEMS FOR FORCED ADVERTISING

(75) Inventor: Johnny B. Corvin, Jenks, OK (US)

(73) Assignee: Rovi Guides, Inc., Santa Clara, CA (US)

( * ) Notice: Subject to any disclaimer, the term of this patent is extended or adjusted under 35 U.S.C. 154(b) by 130 days.

(21) Appl. No.: 12/911,576

(22) Filed: Oct. 25, 2010

(65) Prior Publication Data

US 2011/0126227 A1    May 26, 2011

Related U.S. Application Data

(63) Continuation of application No. 12/481,484, filed on Jun. 9, 2009, now abandoned, which is a continuation of application No. 09/775,115, filed on Feb. 1, 2001, now abandoned.

(60) Provisional application No. 60/179,551, filed on Feb. 1, 2000.

(51) Int. Cl.
*H04N 7/16* (2011.01)
*H04N 21/44* (2011.01)
(Continued)

(52) U.S. Cl.
CPC .............. *H04N 7/165* (2013.01); *G06Q 30/02* (2013.01); *H04N 5/445* (2013.01); *H04N 5/76* (2013.01); *H04N 5/775* (2013.01); *H04N 21/4331* (2013.01); *H04N 21/4383* (2013.01); *H04N 21/44* (2013.01); *H04N 21/44004* (2013.01); *H04N 21/44016* (2013.01);
(Continued)

(58) Field of Classification Search
USPC ......................................................... 725/34
See application file for complete search history.

(56) References Cited

U.S. PATENT DOCUMENTS 4,355,415 A    10/1982 George et al.
4,429,385 A    1/1984 Cichelli et al.
(Continued)

FOREIGN PATENT DOCUMENTS

CN    1129879 A    8/1996
CN    1164162 A    11/1997
(Continued)

OTHER PUBLICATIONS

"Digital Video Broadcasting (DVB); DVB specification for data broadcasting",European Telecommunications Standards Institute, Draft EN 301 192 V1.2.1 (1999).
(Continued)

*Primary Examiner* — Justin Shepard
(74) *Attorney, Agent, or Firm* — Ropes & Gray LLP

(57) ABSTRACT

Methods and systems for forced advertising are provided. These methods and systems determine when a forced advertisement is to be presented, determine what forced advertisement is to be presented, and control how the forced advertisement is to be presented. A forced advertisement may be received prior to the time at which the forced advertisement is to be presented or when needed. The forced advertisement may be presented when certain broadcast advertisements are being broadcast, at certain times of the day, or at certain times within a program. The forced advertisements may be selected based upon content of a replaced broadcast advertisement, content of a nearby program, or independently of any broadcast-related factors. Finally, forced advertisements may be presented so that a television viewer cannot escape viewing the advertisement by changing channels or turning off the television.

30 Claims, 4 Drawing Sheets

(51) Int. Cl.
    *G06Q 30/02*      (2012.01)
    *H04N 5/445*      (2011.01)
    *H04N 5/76*       (2006.01)
    *H04N 5/775*      (2006.01)
    *H04N 21/433*     (2011.01)
    *H04N 21/438*     (2011.01)
    *H04N 21/458*     (2011.01)
    *H04N 21/6543*    (2011.01)
    *H04N 21/6587*    (2011.01)
    *H04N 21/81*      (2011.01)
    *H04N 21/478*     (2011.01)

(52) U.S. Cl.
    CPC ........ *H04N 21/458* (2013.01); *H04N 21/6543* (2013.01); *H04N 21/6587* (2013.01); *H04N 21/812* (2013.01); *H04N 21/478* (2013.01)

(56) References Cited

U.S. PATENT DOCUMENTS

| | | |
|---|---|---|
| 4,573,072 A | 2/1986 | Freeman |
| 4,602,279 A | 7/1986 | Freeman |
| 4,605,964 A | 8/1986 | Chard |
| 4,625,080 A | 11/1986 | Scott |
| 4,635,109 A | 1/1987 | Comeau |
| 4,685,131 A | 8/1987 | Horne |
| 4,694,490 A | 9/1987 | Harvey et al. |
| 4,704,725 A | 11/1987 | Harvey et al. |
| 4,706,121 A | 11/1987 | Young |
| 4,718,107 A | 1/1988 | Hayes |
| 4,750,213 A | 6/1988 | Novak |
| 4,751,578 A | 6/1988 | Reiter et al. |
| 4,761,684 A | 8/1988 | Clark et al. |
| 4,787,063 A | 11/1988 | Muguet |
| 4,814,883 A | 3/1989 | Perine et al. |
| 4,847,698 A | 7/1989 | Freeman |
| 4,847,699 A | 7/1989 | Freeman |
| 4,847,700 A | 7/1989 | Freeman |
| 4,857,999 A | 8/1989 | Welsh |
| 4,864,429 A | 9/1989 | Eigeldinger et al. |
| 4,908,707 A | 3/1990 | Kinghorn |
| 4,930,158 A | 5/1990 | Vogel |
| 4,930,160 A | 5/1990 | Vogel |
| 4,945,563 A | 7/1990 | Horton et al. |
| 4,959,720 A | 9/1990 | Duffield et al. |
| 4,965,825 A | 10/1990 | Harvey et al. |
| 4,977,455 A | 12/1990 | Young |
| 5,027,400 A | 6/1991 | Baji et al. |
| 5,036,314 A | 7/1991 | Barillari et al. |
| 5,038,211 A | 8/1991 | Hallenbeck |
| 5,047,867 A | 9/1991 | Strubbe et al. |
| 5,089,885 A | 2/1992 | Clark |
| 5,093,921 A | 3/1992 | Bevins, Jr. |
| 5,099,319 A | 3/1992 | Esch et al. |
| 5,109,279 A | 4/1992 | Ando |
| 5,109,414 A | 4/1992 | Harvey et al. |
| 5,113,259 A | 5/1992 | Romesburg et al. |
| 5,132,992 A | 7/1992 | Yurt et al. |
| 5,134,719 A | 7/1992 | Mankovitz |
| 5,151,789 A | 9/1992 | Young |
| 5,155,591 A | 10/1992 | Wachob |
| 5,162,905 A | 11/1992 | Itoh et al. |
| 5,172,413 A | 12/1992 | Bradley et al. |
| 5,200,822 A | 4/1993 | Bronfin et al. |
| 5,210,611 A | 5/1993 | Yee et al. |
| 5,216,515 A | 6/1993 | Steele et al. |
| 5,223,924 A | 6/1993 | Strubbe |
| RE34,340 E | 8/1993 | Freeman |
| 5,233,423 A | 8/1993 | Jernigan et al. |
| 5,233,654 A | 8/1993 | Harvey et al. |
| 5,241,428 A | 8/1993 | Goldwasser et al. |
| 5,253,066 A | 10/1993 | Vogel |
| 5,283,639 A | 2/1994 | Esch et al. |
| 5,323,234 A | 6/1994 | Kawasaki |
| 5,335,277 A | 8/1994 | Harvey et al. |
| 5,353,121 A | 10/1994 | Young et al. |
| 5,359,367 A | 10/1994 | Stockill |
| 5,371,551 A | 12/1994 | Logan et al. |
| 5,382,983 A | 1/1995 | Kwoh et al. |
| 5,410,326 A | 4/1995 | Goldstein |
| 5,410,344 A | 4/1995 | Graves et al. |
| 5,412,720 A | 5/1995 | Hoarty |
| 5,414,756 A | 5/1995 | Levine |
| 5,416,508 A | 5/1995 | Sakuma et al. |
| 5,424,770 A | 6/1995 | Schmelzer et al. |
| 5,438,423 A | 8/1995 | Lynch et al. |
| 5,442,389 A | 8/1995 | Blahut et al. |
| 5,446,919 A * | 8/1995 | Wilkins .......................... 725/35 |
| 5,449,522 A | 9/1995 | Hill |
| 5,455,570 A | 10/1995 | Cook et al. |
| 5,459,522 A | 10/1995 | Pint |
| 5,461,415 A | 10/1995 | Wolf et al. |
| 5,465,113 A | 11/1995 | Gilboy |
| 5,469,206 A | 11/1995 | Strubbe et al. |
| 5,479,266 A | 12/1995 | Young et al. |
| 5,479,268 A | 12/1995 | Young et al. |
| 5,481,296 A | 1/1996 | Cragun et al. |
| 5,483,278 A | 1/1996 | Strubbe et al. |
| 5,485,197 A | 1/1996 | Hoarty |
| 5,485,219 A | 1/1996 | Woo |
| 5,502,504 A | 3/1996 | Marshall et al. |
| 5,509,908 A | 4/1996 | Hillstead et al. |
| 5,515,098 A | 5/1996 | Carles |
| 5,517,257 A | 5/1996 | Dunn et al. |
| 5,523,794 A | 6/1996 | Mankovitz et al. |
| 5,523,796 A | 6/1996 | Marshall et al. |
| 5,524,195 A | 6/1996 | Clanton, III et al. |
| 5,526,034 A | 6/1996 | Hoarty et al. |
| 5,526,035 A | 6/1996 | Lappington et al. |
| 5,528,304 A | 6/1996 | Cherrick et al. |
| 5,532,735 A | 7/1996 | Blahut et al. |
| 5,534,911 A | 7/1996 | Levitan |
| 5,539,449 A | 7/1996 | Blahut et al. |
| 5,539,822 A | 7/1996 | Lett |
| 5,543,929 A | 8/1996 | Mankovitz et al. |
| 5,546,488 A | 8/1996 | Kitamura et al. |
| 5,550,576 A | 8/1996 | Klosterman |
| 5,559,548 A | 9/1996 | Davis et al. |
| 5,559,549 A | 9/1996 | Hendricks et al. |
| 5,559,550 A | 9/1996 | Mankovitz |
| 5,561,516 A | 10/1996 | Noble et al. |
| 5,568,272 A | 10/1996 | Levine |
| 5,570,295 A | 10/1996 | Isenberg et al. |
| 5,572,442 A | 11/1996 | Schulhof et al. |
| 5,579,239 A | 11/1996 | Freeman et al. |
| 5,583,560 A | 12/1996 | Florin et al. |
| 5,583,563 A | 12/1996 | Wanderscheid et al. |
| 5,585,838 A | 12/1996 | Lawler et al. |
| 5,585,858 A | 12/1996 | Harper et al. |
| 5,585,865 A | 12/1996 | Amano et al. |
| 5,585,866 A | 12/1996 | Miller et al. |
| 5,589,892 A | 12/1996 | Knee et al. |
| 5,592,551 A | 1/1997 | Lett et al. |
| 5,594,509 A | 1/1997 | Florin et al. |
| 5,596,373 A | 1/1997 | White et al. |
| 5,600,364 A | 2/1997 | Hendricks et al. |
| 5,600,366 A | 2/1997 | Schulman |
| 5,600,573 A | 2/1997 | Hendricks et al. |
| 5,602,582 A | 2/1997 | Wanderscheid et al. |
| 5,606,374 A | 2/1997 | Bertram |
| 5,610,653 A | 3/1997 | Abecassis |
| 5,617,526 A | 4/1997 | Oran et al. |
| 5,619,247 A | 4/1997 | Russo |
| 5,619,249 A | 4/1997 | Billock et al. |
| 5,619,274 A | 4/1997 | Roop et al. |
| 5,621,456 A | 4/1997 | Florin et al. |
| 5,623,613 A | 4/1997 | Rowe et al. |
| 5,629,733 A | 5/1997 | Youman et al. |
| 5,630,119 A | 5/1997 | Aristides et al. |
| 5,631,995 A | 5/1997 | Weissensteiner et al. |
| 5,632,007 A | 5/1997 | Freeman |
| 5,635,978 A | 6/1997 | Alten et al. |
| 5,635,979 A | 6/1997 | Kostreski et al. |

(56) References Cited

U.S. PATENT DOCUMENTS

| | | | |
|---|---|---|---|
| 5,640,484 A | 6/1997 | Mankovitz | |
| 5,650,831 A | 7/1997 | Farwell | |
| 5,652,615 A | 7/1997 | Bryant et al. | |
| 5,654,748 A | 8/1997 | Matthews, III | |
| 5,654,886 A | 8/1997 | Zereski, Jr. et al. | |
| 5,657,072 A | 8/1997 | Aristides et al. | |
| 5,657,414 A | 8/1997 | Lett et al. | |
| 5,659,350 A | 8/1997 | Hendricks et al. | |
| 5,661,516 A | 8/1997 | Carles | |
| 5,663,757 A | 9/1997 | Morales | |
| 5,666,293 A | 9/1997 | Metz et al. | |
| 5,666,645 A | 9/1997 | Thomas et al. | |
| 5,675,390 A | 10/1997 | Schindler et al. | |
| 5,682,195 A | 10/1997 | Hendricks et al. | |
| 5,682,196 A | 10/1997 | Freeman | |
| 5,682,206 A | 10/1997 | Wehmeyer et al. | |
| 5,684,525 A | 11/1997 | Klosterman | |
| 5,689,648 A | 11/1997 | Diaz et al. | |
| 5,692,214 A | 11/1997 | Levine | |
| 5,694,163 A | 12/1997 | Harrison | |
| 5,694,381 A | 12/1997 | Sako | |
| 5,696,905 A | 12/1997 | Reimer et al. | |
| 5,699,107 A | 12/1997 | Lawler et al. | |
| 5,701,383 A | 12/1997 | Russo et al. | |
| 5,708,478 A | 1/1998 | Tognazzini | |
| 5,710,601 A | 1/1998 | Marshall et al. | |
| 5,710,815 A | 1/1998 | Ming et al. | |
| 5,717,452 A | 2/1998 | Janin et al. | |
| 5,721,827 A | 2/1998 | Logan et al. | |
| 5,721,829 A | 2/1998 | Dunn et al. | |
| 5,724,091 A | 3/1998 | Freeman et al. | |
| 5,724,472 A | 3/1998 | Abecassis | |
| 5,729,280 A * | 3/1998 | Inoue et al. | 725/101 |
| 5,734,853 A | 3/1998 | Hendricks et al. | |
| 5,734,893 A | 3/1998 | Li et al. | |
| 5,740,549 A | 4/1998 | Reilly et al. | |
| 5,745,710 A | 4/1998 | Clanton, III et al. | |
| 5,748,191 A | 5/1998 | Rozak et al. | |
| 5,748,716 A | 5/1998 | Levine | |
| 5,751,282 A | 5/1998 | Girard et al. | |
| 5,751,335 A | 5/1998 | Shintani | |
| 5,752,159 A | 5/1998 | Faust et al. | |
| 5,754,771 A | 5/1998 | Epperson et al. | |
| 5,757,417 A | 5/1998 | Aras et al. | |
| 5,758,257 A | 5/1998 | Herz et al. | |
| 5,758,259 A | 5/1998 | Lawler | |
| 5,760,821 A | 6/1998 | Ellis et al. | |
| 5,761,601 A | 6/1998 | Nemirofsky et al. | |
| 5,761,606 A | 6/1998 | Wolzien | |
| 5,768,528 A | 6/1998 | Stumm | |
| 5,774,170 A | 6/1998 | Hite et al. | |
| 5,774,534 A | 6/1998 | Mayer | |
| 5,774,664 A | 6/1998 | Hidary et al. | |
| 5,774,666 A | 6/1998 | Portuesi | |
| 5,778,181 A | 7/1998 | Hidary et al. | |
| 5,778,182 A | 7/1998 | Cathey et al. | |
| 5,781,226 A | 7/1998 | Sheehan | |
| 5,781,228 A | 7/1998 | Sposato | |
| 5,781,246 A | 7/1998 | Alten et al. | |
| 5,787,259 A | 7/1998 | Haroun et al. | |
| 5,788,507 A | 8/1998 | Redford et al. | |
| 5,790,202 A | 8/1998 | Kummer et al. | |
| 5,793,964 A | 8/1998 | Rogers et al. | |
| 5,796,952 A | 8/1998 | Davis et al. | |
| 5,798,785 A | 8/1998 | Hendricks et al. | |
| 5,802,284 A | 9/1998 | Karlton et al. | |
| 5,805,154 A | 9/1998 | Brown | |
| 5,805,763 A | 9/1998 | Lawler et al. | |
| 5,805,804 A | 9/1998 | Laursen et al. | |
| 5,805,974 A | 9/1998 | Hite et al. | |
| 5,808,608 A | 9/1998 | Young et al. | |
| 5,812,123 A | 9/1998 | Rowe et al. | |
| 5,812,931 A | 9/1998 | Yuen | |
| 5,815,671 A | 9/1998 | Morrison | |
| 5,818,438 A | 10/1998 | Howe et al. | |
| 5,818,439 A | 10/1998 | Nagasaka et al. | |
| 5,818,935 A | 10/1998 | Maa | |
| 5,819,019 A | 10/1998 | Nelson | |
| 5,828,420 A | 10/1998 | Marshall et al. | |
| 5,828,945 A | 10/1998 | Klosterman | |
| 5,830,068 A | 11/1998 | Brenner et al. | |
| 5,838,314 A | 11/1998 | Neel et al. | |
| 5,844,620 A | 12/1998 | Coleman et al. | |
| 5,847,750 A | 12/1998 | Srivastava et al. | |
| 5,848,392 A | 12/1998 | Shudo | |
| 5,858,866 A | 1/1999 | Berry et al. | |
| 5,861,881 A | 1/1999 | Freeman et al. | |
| 5,867,233 A | 2/1999 | Tanaka et al. | |
| 5,873,022 A * | 2/1999 | Huizer et al. | 725/100 |
| 5,880,768 A | 3/1999 | Lemmons et al. | |
| 5,884,141 A * | 3/1999 | Inoue et al. | 725/101 |
| 5,886,731 A | 3/1999 | Ebisawa | |
| 5,886,732 A | 3/1999 | Humpleman | |
| 5,887,133 A | 3/1999 | Brown et al. | |
| 5,887,243 A | 3/1999 | Harvey et al. | |
| 5,892,535 A | 4/1999 | Allen et al. | |
| 5,907,323 A | 5/1999 | Lawler et al. | |
| 5,907,366 A | 5/1999 | Farmer et al. | |
| 5,912,696 A | 6/1999 | Buehl | |
| 5,914,746 A | 6/1999 | Matthews, III et al. | |
| 5,917,830 A | 6/1999 | Chen et al. | |
| 5,918,010 A | 6/1999 | Appleman et al. | |
| 5,929,849 A | 7/1999 | Kikinis | |
| 5,940,073 A | 8/1999 | Klosterman et al. | |
| 5,940,572 A | 8/1999 | Balaban et al. | |
| 5,959,623 A | 9/1999 | van Hoff et al. | |
| 5,961,603 A | 10/1999 | Kunkel et al. | |
| 5,973,684 A | 10/1999 | Brooks et al. | |
| 5,974,222 A | 10/1999 | Yuen et al. | |
| 5,977,964 A | 11/1999 | Williams et al. | |
| 5,987,210 A | 11/1999 | Iggulden et al. | |
| 5,988,078 A | 11/1999 | Levine | |
| 5,995,092 A | 11/1999 | Yuen et al. | |
| 6,002,393 A | 12/1999 | Hite et al. | |
| 6,002,394 A | 12/1999 | Schein et al. | |
| 6,005,603 A | 12/1999 | Flavin | |
| 6,006,257 A | 12/1999 | Slezak | |
| 6,011,537 A | 1/2000 | Slotznick | |
| 6,014,137 A | 1/2000 | Burns | |
| 6,014,184 A | 1/2000 | Knee et al. | |
| 6,018,765 A | 1/2000 | Durana et al. | |
| 6,018,768 A | 1/2000 | Ullman et al. | |
| 6,025,837 A | 2/2000 | Matthews, III et al. | |
| 6,029,045 A | 2/2000 | Picco et al. | |
| 6,029,195 A | 2/2000 | Herz | |
| 6,038,367 A | 3/2000 | Abecassis | |
| 6,049,539 A | 4/2000 | Lee et al. | |
| 6,049,824 A | 4/2000 | Simonin | |
| 6,057,872 A * | 5/2000 | Candelore | 725/23 |
| 6,061,719 A | 5/2000 | Bendinelli et al. | |
| 6,064,376 A | 5/2000 | Berezowski et al. | |
| 6,067,303 A | 5/2000 | Aaker et al. | |
| 6,075,551 A | 6/2000 | Berezowski et al. | |
| 6,078,348 A | 6/2000 | Klosterman et al. | |
| 6,097,383 A | 8/2000 | Gaughan et al. | |
| 6,097,441 A | 8/2000 | Allport | |
| 6,104,334 A | 8/2000 | Allport | |
| 6,130,726 A | 10/2000 | Darbee et al. | |
| 6,141,488 A | 10/2000 | Knudson et al. | |
| 6,151,059 A | 11/2000 | Schein et al. | |
| 6,157,413 A | 12/2000 | Hanafee et al. | |
| 6,160,545 A | 12/2000 | Eyer et al. | |
| 6,160,546 A | 12/2000 | Thompson et al. | |
| 6,172,677 B1 | 1/2001 | Stautner et al. | |
| 6,173,271 B1 | 1/2001 | Goodman et al. | |
| 6,177,931 B1 | 1/2001 | Alexander et al. | |
| 6,181,364 B1 | 1/2001 | Ford | |
| 6,182,050 B1 | 1/2001 | Ballard | |
| 6,186,443 B1 | 2/2001 | Shaffer | |
| 6,191,780 B1 | 2/2001 | Martin et al. | |
| 6,198,509 B1 | 3/2001 | Dougherty et al. | |
| 6,208,384 B1 | 3/2001 | Schultheiss | |
| 6,209,129 B1 | 3/2001 | Carr et al. | |
| 6,209,130 B1 | 3/2001 | Rector, Jr. et al. | |

(56) References Cited

U.S. PATENT DOCUMENTS

| | | | |
|---|---|---|---|
| 6,215,526 | B1 | 4/2001 | Barton et al. |
| 6,226,793 | B1 | 5/2001 | Kwoh |
| 6,233,389 | B1 | 5/2001 | Barton et al. |
| 6,233,734 | B1 | 5/2001 | Macrae et al. |
| 6,239,794 | B1 | 5/2001 | Yuen et al. |
| 6,263,501 | B1 | 7/2001 | Schein et al. |
| 6,263,505 | B1 | 7/2001 | Walker et al. |
| 6,268,849 | B1 | 7/2001 | Boyer et al. |
| 6,282,713 | B1 | 8/2001 | Kitsukawa et al. |
| 6,298,218 | B1 * | 10/2001 | Lowe et al. .................. 455/66.1 |
| 6,310,886 | B1 | 10/2001 | Barton |
| 6,323,911 | B1 | 11/2001 | Schein et al. |
| 6,331,877 | B1 | 12/2001 | Bennington et al. |
| 6,354,378 | B1 | 3/2002 | Patel |
| 6,357,042 | B2 | 3/2002 | Srinivasan et al. |
| 6,357,043 | B1 | 3/2002 | Ellis et al. |
| 6,381,362 | B1 * | 4/2002 | Deshpande et al. .......... 382/162 |
| 6,381,582 | B1 | 4/2002 | Walker et al. |
| 6,388,714 | B1 | 5/2002 | Schein et al. |
| 6,400,407 | B1 | 6/2002 | Zigmond et al. |
| 6,430,743 | B1 | 8/2002 | Matsuura |
| 6,446,261 | B1 * | 9/2002 | Rosser ............................ 725/34 |
| 6,460,018 | B1 | 10/2002 | Kasai et al. |
| 6,463,585 | B1 | 10/2002 | Hendricks et al. |
| 6,477,579 | B1 | 11/2002 | Kunkel et al. |
| 6,483,987 | B1 | 11/2002 | Goldschmidt Iki et al. |
| 6,486,920 | B2 | 11/2002 | Arai et al. |
| 6,490,722 | B1 | 12/2002 | Barton et al. |
| 6,519,584 | B1 | 2/2003 | Tognazzini et al. |
| 6,546,556 | B1 | 4/2003 | Kataoka et al. |
| 6,553,178 | B2 | 4/2003 | Abecassis |
| 6,564,378 | B1 | 5/2003 | Satterfield et al. |
| 6,574,424 | B1 | 6/2003 | Dimitri et al. |
| 6,580,870 | B1 | 6/2003 | Kanazawa et al. |
| 6,594,825 | B1 * | 7/2003 | Goldschmidt Iki et al. .... 725/53 |
| 6,611,537 | B1 | 8/2003 | Edens et al. |
| 6,611,654 | B1 | 8/2003 | Shteyn |
| 6,660,503 | B2 | 12/2003 | Kierulff |
| 6,698,020 | B1 * | 2/2004 | Zigmond et al. ................ 725/34 |
| 6,714,975 | B1 | 3/2004 | Aggarwal et al. |
| 6,728,713 | B1 | 4/2004 | Beach et al. |
| 6,738,978 | B1 | 5/2004 | Hendricks et al. |
| 6,742,047 | B1 | 5/2004 | Tso |
| 6,742,183 | B1 | 5/2004 | Reynolds et al. |
| 6,751,800 | B1 | 6/2004 | Fukuda et al. |
| 6,756,997 | B1 | 6/2004 | Ward, III et al. |
| 6,757,906 | B1 | 6/2004 | Look et al. |
| 6,760,537 | B2 | 7/2004 | Mankovitz |
| 6,799,326 | B2 | 9/2004 | Boylan, III et al. |
| 6,802,074 | B1 | 10/2004 | Mitsui et al. |
| 6,813,775 | B1 | 11/2004 | Finseth et al. |
| 6,837,789 | B2 | 1/2005 | Garahi et al. |
| 6,847,778 | B1 | 1/2005 | Vallone et al. |
| 6,850,691 | B1 | 2/2005 | Stam et al. |
| 6,950,624 | B2 | 9/2005 | Kim et al. |
| 6,973,669 | B2 | 12/2005 | Daniels |
| 7,020,704 | B1 | 3/2006 | Lipscomb et al. |
| 7,079,176 | B1 | 7/2006 | Freeman et al. |
| 7,088,952 | B1 | 8/2006 | Saito et al. |
| 7,134,136 | B2 | 11/2006 | Hanai et al. |
| 7,185,353 | B2 | 2/2007 | Schlack |
| 7,194,754 | B2 | 3/2007 | Tomsen et al. |
| 7,200,852 | B1 | 4/2007 | Block |
| 7,503,055 | B2 | 3/2009 | Reynolds et al. |
| 7,584,491 | B2 | 9/2009 | Bruckner et al. |
| 7,610,597 | B1 * | 10/2009 | Johnson et al. ................ 725/32 |
| 7,716,700 | B2 | 5/2010 | Carlucci et al. |
| 7,889,964 | B1 | 2/2011 | Barton et al. |
| 2001/0001159 | A1 | 5/2001 | Ford |
| 2001/0029610 | A1 | 10/2001 | Corvin et al. |
| 2001/0047298 | A1 | 11/2001 | Moore et al. |
| 2001/0049820 | A1 | 12/2001 | Barton |
| 2002/0037160 | A1 | 3/2002 | Locket et al. |
| 2002/0054062 | A1 | 5/2002 | Gerba et al. |
| 2002/0056087 | A1 | 5/2002 | Berezowski et al. |
| 2002/0083439 | A1 | 6/2002 | Eldering |
| 2002/0083441 | A1 | 6/2002 | Flickinger et al. |
| 2002/0090203 | A1 | 7/2002 | Mankovitz |
| 2002/0092017 | A1 | 7/2002 | Klosterman et al. |
| 2002/0104090 | A1 | 8/2002 | Stettner |
| 2002/0124249 | A1 | 9/2002 | Shintani et al. |
| 2002/0144262 | A1 | 10/2002 | Plotnick et al. |
| 2002/0146233 | A1 | 10/2002 | Barton et al. |
| 2002/0166120 | A1 | 11/2002 | Boylan et al. |
| 2002/0174430 | A1 | 11/2002 | Ellis et al. |
| 2002/0191954 | A1 | 12/2002 | Beach et al. |
| 2002/0199186 | A1 | 12/2002 | Ali et al. |
| 2003/0026589 | A1 | 2/2003 | Barton et al. |
| 2003/0028761 | A1 | 2/2003 | Platt |
| 2003/0037068 | A1 | 2/2003 | Thomas et al. |
| 2003/0037333 | A1 | 2/2003 | Ghashghai et al. |
| 2003/0056219 | A1 | 3/2003 | Reichardt et al. |
| 2003/0110499 | A1 | 6/2003 | Knudson et al. |
| 2003/0131252 | A1 | 7/2003 | Barton |
| 2003/0131359 | A1 | 7/2003 | Moskowitz |
| 2003/0163813 | A1 | 8/2003 | Klosterman et al. |
| 2003/0163832 | A1 | 8/2003 | Tsuria et al. |
| 2003/0164858 | A1 | 9/2003 | Klosterman et al. |
| 2003/0182567 | A1 | 9/2003 | Barton et al. |
| 2003/0188310 | A1 | 10/2003 | Klosterman et al. |
| 2003/0188311 | A1 | 10/2003 | Yuen et al. |
| 2003/0196201 | A1 | 10/2003 | Schein et al. |
| 2003/0206720 | A1 | 11/2003 | Abecassis |
| 2003/0208756 | A1 | 11/2003 | Macrae et al. |
| 2003/0219227 | A1 | 11/2003 | Otala et al. |
| 2004/0013406 | A1 | 1/2004 | Barton et al. |
| 2004/0013409 | A1 | 1/2004 | Beach et al. |
| 2004/0223747 | A1 | 11/2004 | Otala et al. |
| 2004/0226034 | A1 | 11/2004 | Kaczowka et al. |
| 2004/0237102 | A1 | 11/2004 | Konig et al. |
| 2004/0261096 | A1 | 12/2004 | Matz |
| 2005/0028208 | A1 | 2/2005 | Ellis et al. |
| 2005/0076359 | A1 | 4/2005 | Pierson et al. |
| 2005/0120373 | A1 | 6/2005 | Thomas et al. |
| 2005/0204388 | A1 | 9/2005 | Knudson et al. |
| 2005/0240961 | A1 | 10/2005 | Jerding et al. |
| 2005/0244138 | A1 | 11/2005 | O'Connor et al. |
| 2005/0251827 | A1 | 11/2005 | Ellis et al. |
| 2005/0283796 | A1 | 12/2005 | Flickinger |
| 2006/0031883 | A1 | 2/2006 | Ellis et al. |
| 2006/0271980 | A1 | 11/2006 | Mankovitz |
| 2006/0288366 | A1 | 12/2006 | Boylan et al. |
| 2007/0266400 | A1 | 11/2007 | Rogers et al. |
| 2008/0127246 | A1 | 5/2008 | Sylvain |
| 2009/0228912 | A1 | 9/2009 | Reynolds et al. |
| 2010/0106574 | A1 | 4/2010 | Cartwright |
| 2010/0111493 | A1 | 5/2010 | Corvin et al. |
| 2010/0175080 | A1 | 7/2010 | Yuen et al. |
| 2011/0197222 | A1 | 8/2011 | Corvin et al. |

FOREIGN PATENT DOCUMENTS

| | | |
|---|---|---|
| CN | 1226030 | 8/1999 |
| DE | 31 51 492 | 7/1983 |
| DE | 19 531 121 A1 | 2/1997 |
| DE | 19 740 079 A1 | 3/1999 |
| EP | 0013096 A1 | 7/1980 |
| EP | 0322909 A2 | 7/1989 |
| EP | 0 363 847 A1 | 4/1990 |
| EP | 0382764 A1 | 8/1990 |
| EP | 0 424 648 | 5/1991 |
| EP | 0589369 A1 | 3/1994 |
| EP | 0752767 A2 | 1/1997 |
| EP | 0 774 853 | 5/1997 |
| EP | 0773682 A2 | 5/1997 |
| EP | 0788106 A1 | 8/1997 |
| EP | 0 793 225 | 9/1997 |
| EP | 0 804 028 A1 | 10/1997 |
| EP | 0803701 A2 | 10/1997 |
| EP | 0805594 A2 | 11/1997 |
| EP | 0822718 | 2/1998 |
| EP | 0 838 820 | 4/1998 |
| EP | 0 981 248 | 2/2000 |
| EP | 1067792 A2 | 1/2001 |

(56) References Cited

FOREIGN PATENT DOCUMENTS

| | | |
|---|---|---|
| EP | 1 093 305 A2 | 4/2001 |
| EP | 1095504 A2 | 5/2001 |
| EP | 1434432 A2 | 6/2004 |
| EP | 1 499 113 | 1/2005 |
| EP | 1705908 A2 | 9/2006 |
| EP | 2146507 A2 | 1/2010 |
| GB | 2 227 622 | 8/1990 |
| GB | 2265792 | 10/1993 |
| GB | 2307381 | 5/1997 |
| JP | 03-022770 | 1/1991 |
| JP | 03063990 A | 3/1991 |
| JP | 6022315 A | 1/1994 |
| JP | 8-56352 | 2/1996 |
| JP | 08076778 | 3/1996 |
| JP | 8-505498 | 6/1996 |
| JP | 8-506939 | 7/1996 |
| JP | 9065321 A | 3/1997 |
| JP | 09-102827 A | 4/1997 |
| JP | 9130346 A | 5/1997 |
| JP | 9-510327 | 10/1997 |
| JP | 10-108145 A | 4/1998 |
| JP | 10162484 | 6/1998 |
| JP | 11341370 A | 12/1999 |
| WO | WO-8703766 A1 | 6/1987 |
| WO | WO-8804507 A1 | 6/1988 |
| WO | WO-8902682 A1 | 3/1989 |
| WO | WO-8903085 A1 | 4/1989 |
| WO | WO-90/00847 A1 | 1/1990 |
| WO | WO-9323957 A1 | 11/1993 |
| WO | WO-9414282 A1 | 6/1994 |
| WO | WO-9414284 A1 | 6/1994 |
| WO | WO-9501056 A1 | 1/1995 |
| WO | WO-9501059 A1 | 1/1995 |
| WO | WO-9504431 A2 | 2/1995 |
| WO | WO-95/07003 | 3/1995 |
| WO | WO 95/07003 | 3/1995 |
| WO | WO-9510910 A2 | 4/1995 |
| WO | WO-9528055 A1 | 10/1995 |
| WO | WO-95/32585 | 11/1995 |
| WO | WO 95/32585 | 11/1995 |
| WO | WO-9531069 A1 | 11/1995 |
| WO | WO-96/08923 A1 | 3/1996 |
| WO | WO 96/09721 | 3/1996 |
| WO | WO-96/09721 A1 | 3/1996 |
| WO | WO-9607270 A1 | 3/1996 |
| WO | WO-9613932 A1 | 5/1996 |
| WO | WO-9620555 A1 | 7/1996 |
| WO | WO-9625821 A1 | 8/1996 |
| WO | WO 96/34491 | 10/1996 |
| WO | WO-96/34491 A1 | 10/1996 |
| WO | WO-9634486 A1 | 10/1996 |
| WO | WO-9641471 A1 | 12/1996 |
| WO | WO-9641478 A1 | 12/1996 |
| WO | WO-9703521 A2 | 1/1997 |
| WO | WO-9704595 A1 | 2/1997 |
| WO | WO-9713368 A1 | 4/1997 |
| WO | WO-97/17774 A1 | 5/1997 |
| WO | WO-97/18675 | 5/1997 |
| WO | WO 97/18675 | 5/1997 |
| WO | WO-9719555 A1 | 5/1997 |
| WO | WO 97/31480 | 8/1997 |
| WO | WO-97/31480 | 8/1997 |
| WO | WO-9729458 A1 | 8/1997 |
| WO | WO-9736422 A1 | 10/1997 |
| WO | WO 97/42763 | 11/1997 |
| WO | WO-97/42763 | 11/1997 |
| WO | WO 97/49241 | 12/1997 |
| WO | WO-97/49242 | 12/1997 |
| WO | WO 97/49242 | 12/1997 |
| WO | WO-9746943 A1 | 12/1997 |
| WO | WO-9747106 A1 | 12/1997 |
| WO | WO-9747124 A1 | 12/1997 |
| WO | WO-9747143 A2 | 12/1997 |
| WO | WO-9748230 A1 | 12/1997 |
| WO | WO-9749237 A1 | 12/1997 |
| WO | WO-9750251 | 12/1997 |
| WO | WO-9800975 A1 | 1/1998 |
| WO | WO-9800976 A1 | 1/1998 |
| WO | WO-9806219 A1 | 2/1998 |
| WO | WO-9810589 A1 | 3/1998 |
| WO | WO-9816062 A1 | 4/1998 |
| WO | WO-9817064 A1 | 4/1998 |
| WO | WO-9820675 A1 | 5/1998 |
| WO | WO-9826569 A2 | 6/1998 |
| WO | WO-9826577 A2 | 6/1998 |
| WO | WO-9826584 A1 | 6/1998 |
| WO | WO-9826596 A1 | 6/1998 |
| WO | WO-9827723 A1 | 6/1998 |
| WO | WO-9839893 A2 | 9/1998 |
| WO | WO-98/43406 A1 | 10/1998 |
| WO | WO-9848566 A2 | 10/1998 |
| WO | WO-9851076 A1 | 11/1998 |
| WO | WO-9859493 A1 | 12/1998 |
| WO | WO-9903267 A1 | 1/1999 |
| WO | WO-9904561 A1 | 1/1999 |
| WO | WO 99/11065 | 3/1999 |
| WO | WO-9913471 A1 | 3/1999 |
| WO | WO-9914947 A1 | 3/1999 |
| WO | WO-9930491 A1 | 6/1999 |
| WO | WO-99/33265 A1 | 7/1999 |
| WO | WO-9939280 A2 | 8/1999 |
| WO | WO-9945700 A1 | 9/1999 |
| WO | WO-9945702 A1 | 9/1999 |
| WO | WO 99/60783 | 11/1999 |
| WO | WO-99/60783 | 11/1999 |
| WO | WO-9956466 A1 | 11/1999 |
| WO | WO-9957904 A1 | 11/1999 |
| WO | WO-9960789 A1 | 11/1999 |
| WO | WO-9966719 A1 | 12/1999 |
| WO | WO-0002380 A2 | 1/2000 |
| WO | WO-0004706 A2 | 1/2000 |
| WO | WO-00/14951 A1 | 3/2000 |
| WO | WO-0011869 A1 | 3/2000 |
| WO | WO-0016548 A1 | 3/2000 |
| WO | WO-0033560 A2 | 6/2000 |
| WO | WO-0033565 A2 | 6/2000 |
| WO | WO-00/40025 A1 | 7/2000 |
| WO | WO-00/57645 A1 | 9/2000 |
| WO | WO-00/59220 A1 | 10/2000 |
| WO | WO-0058834 A1 | 10/2000 |
| WO | WO-0059214 A1 | 10/2000 |
| WO | WO-0059223 A1 | 10/2000 |
| WO | WO-0062299 A1 | 10/2000 |
| WO | WO-0062533 A1 | 10/2000 |
| WO | WO-0079798 A1 | 12/2000 |
| WO | WO-0119086 A2 | 3/2001 |
| WO | WO-0146843 A2 | 6/2001 |
| WO | WO-0146869 A2 | 6/2001 |
| WO | WO-0147238 A2 | 6/2001 |
| WO | WO-0147249 A2 | 6/2001 |
| WO | WO-0147257 A1 | 6/2001 |
| WO | WO-0147273 A1 | 6/2001 |
| WO | WO-0147279 A2 | 6/2001 |
| WO | WO-0150743 A1 | 7/2001 |
| WO | WO-0158158 A2 | 8/2001 |
| WO | WO-03019932 A1 | 3/2003 |
| WO | WO-03058537 A1 | 7/2003 |
| WO | WO-03094134 A2 | 11/2003 |
| WO | WO-2004/063892 A2 | 7/2004 |
| WO | WO-2004/095426 A2 | 11/2004 |
| WO | WO-2008088510 A1 | 7/2008 |

OTHER PUBLICATIONS

"Electronic Programme Guide (EPG); Protocol for a TV Guide using electronic data transmission" by European Telecommunication Standards Institute, May 1997, Valbonne, France, publication No. ETS 300 707.

Enhanced Content Specification, ATVEF, from the Internet at http://www.atvef.com/library/spec.html, printed Aug. 22, 2001, the document bears a Copyright date of 1998, 1999, 2000.

Hartwig et al., Broadcasting and Processing of Program Guides for Digital TV, SMPTE Journal, pp. 727-732, Oct. 1997.

(56) References Cited

OTHER PUBLICATIONS

Honey, is there anything good on the remote tonight?, advertisement from Multichannel News, Broadband Week Section, p. 168, Nov. 30, 1998.

How Evolve Works, from the Internet at http://www.evolveproducts.com/network.html, printed on Dec. 28, 1998.

Index Systems Inc., Gemstar Service Object Model, Data Format Specification, Ver. 2.0.4, pp. 58-59.

ISR and Written Opinion of the International Searching Authority of counterpart application No. PCT/US2007/025094 mailed May 30, 2008.

Jaidev, EXSLT—A Wired and Wireless Case Study, http://csharpcomputing.com/XMLTutorial/Lession15.htm.

Jini Architecture Overview, by Jim Waldo, from the Internet at http://Java.sun.com/products/jini/whitepapers/architectureoverview.pdf/ printed on Jan. 25, 1999. The document bears a copyright date of 1998.48451756_1.

Miller, Matthew D., A Scenario for the Deployment of Interactive Multimedia Cable Television Systems in the United States in the 1990's, proceedings of the IEEE, vol. 82, No. 4, Apr. 1994, pp. 585-589.

OpenTV Launches OpenStreamer™ Technology for Broadcasters to Deliver First Ever Real-Time Digital Interactive Television, from the Internet at http://www.opentv.com/news/openstreamer_press_final.htm, printed on Jun. 28, 1999, the document bears a copyright date of 1999.

Papers Delivered (Part1), 61st National Conference, Information Processing Society of Japan, Oct. 3-5, 2000.

Pogue, D., "State of the Art: for TiVo and Replay, New Reach," N.Y. Times, May 29, 2003.

Prevue Networks and OpenTV(R) Agree to Work Together on Deploying Interactive Program Guides Worldwide, from the internet at http://www.opentv.com/news/prevuefinal.htm, printed on Jun. 28, 1999.

Randerson, J., Let Sofware Catch the Game for You, New Scientist, Jul. 3, 2004.

Reaching your subscribers is a complex and costly process-until now, from the Internet at http://www.evolveproducts.com/info.html, printed on Dec. 28, 1998.

Report on Deliverable AC-312 STORit Project (1999).

Rewind, replay and unwind with new high-tech TV devices, by Lawrence J. Magid, LA Times. This document was printed from the Internet on Jun. 6, 1999 and bears a date of May 19, 1999.

Rogers, C., Telcos vs. Cable TV: The Global View, Data Communications, No. 13, New York, pp. 75, 76, 78 and 80, Sep. 1995.

Sun's Next Steps in Digital Set-Tops, article in Cablevision, p. 56, Nov. 16, 1998.

Technical White Paper, OpenTV™ Operating Environment, (© 1998 OpenTV Inc.), pp. 1-12.

The Evolve EZ Guide. The Remote. Control, from the Internet at http://www.evolveproducts.com/display2.html, printed on Dec. 28, 1998.

Using Starsight 2, published before Apr. 19, 1995.

Verknüpfung von TV mit Internet, Forschung & Entwicklung, vol. 68, No. 18, Aug. 16, 1996, pp. 70-71, XP000631189.

Von Andreas Neumann, WDR Online Aufbau Und Perspektiven Automatisierter Online-Dienste Im WDR, Rundfunktechnische Mitteilungen, vol. 41, pp. 56-66, Jun. 1997.

Von Gerhard Eitz, Zukunftige Informations-Und Datenangebote Beim Digitalen Fernsehen—EPG Und Lesezeichen, Rundfunktechnische Mitteilungen, vol. 41, pp. 76-72, Apr. 30, 1997.

Why Jini Now?, from the internet at http://java.sun.com/products/jini/whitepapers/whyjininow.pdf, printed on Jan. 25, 1999. The document bears a copyright date of 1998.

\* cited by examiner

METHODS AND SYSTEMS FOR FORCED ADVERTISING

CROSS REFERENCE TO RELATED APPLICATIONS

This application is a continuation of U.S. patent application Ser. No. 12/481,484, filed Jun. 9, 2009, now abandoned, which is a continuation of U.S. patent application Ser. No. 09/775,115, filed Feb. 1, 2001, now abandoned, which claims the benefit of U.S. provisional application No. 60/179,551, filed Feb. 1, 2000 each of which are hereby incorporated by reference herein in their entirety.

BACKGROUND OF THE INVENTION

This invention relates to television advertising. More particularly, this invention relates to methods and systems for providing forced advertisements to viewers.

Television viewers are currently exposed to a wide variety of advertising when watching most non-premium television channels. This advertising is typically presented to promote an advertiser's products and services and, at the same time, sponsor or subsidize the cost of providing television programming. Television advertising in this way is generally viewed as a highly effective means of promoting products and services, but is also recognized as being very expensive.

One problem with television advertising is that television viewers frequently change channels as soon as a television advertisement appears. This act is colloquially known as "channel surfing." Recent technologies have also facilitated skipping commercials when programs are buffered by or stored on personal video recorders which digitally store programs on disk drives. For example, when a program is stored on a disk drive of a personal video recorder, a television viewer may press a button that causes the recorded program to jump in thirty second increments and thereby skip the typical thirty second commercial.

Another problem with television advertising is that television broadcasters typically have exclusive control of the advertisements that are shown on a corresponding channel viewed by a television viewer. This prevents a television distributors, such as cable and satellite television companies, from being able to provide alternate advertising to the television viewer.

Thus, it is desirable to provide methods and systems for forcing advertisements on viewers. Such methods and systems preferably facilitate preventing viewers from changing channels away from, or skipping, television advertisements. These methods and systems also preferably facilitate providing alternative advertising from that provided by television broadcasters to television viewers.

SUMMARY OF THE INVENTION

These and other objects of the invention are accomplished in accordance with the principle of the present invention by providing methods and systems for forced advertising.

In accordance with the invention, these methods and systems provide forced advertising by determining when a forced advertisement is to be presented, by determining what forced advertisement is to be presented, and by controlling how the forced advertisement is to be presented. A forced advertisement may be received prior to the time at which the forced advertisement is to be presented. Alternatively, the forced advertisement may be received when needed. The forced advertisement may be presented when certain broadcast advertisements are being broadcast, at certain times of the day, or at certain times within a program. The forced advertisements may be selected based upon content of a replaced broadcast advertisement, content of a nearby program, or independently of any broadcast-related factors. Finally, forced advertisements may be presented so that a television viewer cannot escape viewing the advertisement by changing channels or turning off the television.

BRIEF DESCRIPTION OF THE DRAWINGS

These and other objects and advantages of the invention will become apparent upon reading the following detailed description and upon reference to the drawings in which.

DETAILED DESCRIPTION OF THE PREFERRED EMBODIMENTS

Figure 1:
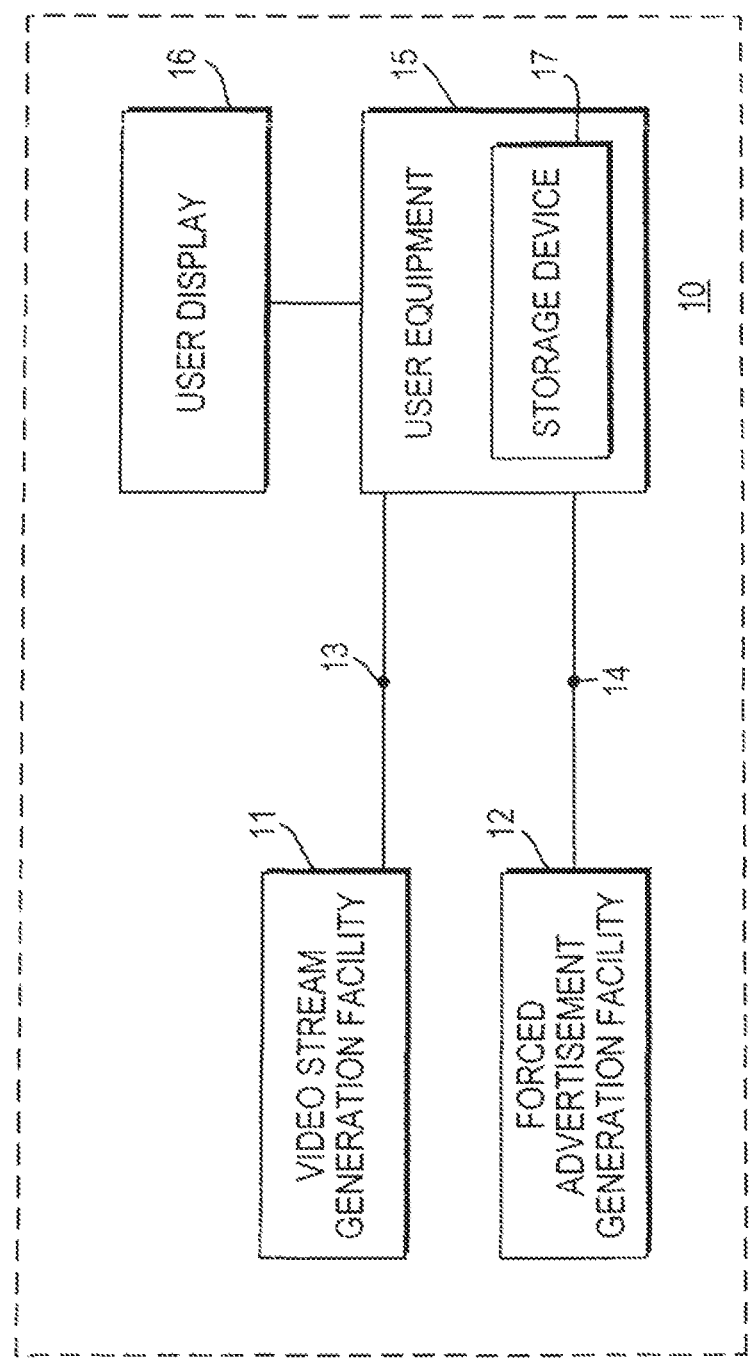
FIG. 1 is a block diagram illustrating hardware that may be used in various embodiments of the present invention.

An illustrative system 10 in accordance with the present invention is shown in FIG. 1. As illustrated, system 10 may include a video stream generation facility 11, a forced advertisement generation facility 12, communication links 13 and 14, user equipment 15, and a user display 16. Video stream generation facility 11 may be used to provide video streams. A video stream may include television, cable, Internet or other suitable media signals with video audio, data, etc. components which, when received by user equipment, may be used to provide suitable display on a user display. Video stream generation facility 11 may include television broadcast equipment, video tape players, video and data servers, etc.

Forced advertisement generation facility 12 may be used to provide forced advertisements. Like video streams, forced advertisements may include television, cable, Internet or other suitable media signals with video, audio, data, etc. components which, when received by user equipment, may be used to provide suitable display on a user display. Forced advertisement generation facility 11 may include television broadcast equipment, video tape players, video and data servers, etc.

System 10 may include multiple video stream generation facilities 11 as well as multiple forced advertisement generation facilities 12, but only one of each has been shown to avoid over-complicating the drawing. Additionally, video stream generation facility 11 and forced advertisement generation facility 12 may be at the same location, such as at a cable head-end, and/or may be combined.

Communications links 13 and 14 may be used to transmit video streams and forced advertisements to user equipment, and may include, for example, a satellite link, a telephone network link, a cable or fiber optic link, a microwave link, an Internet link, a data-over-cable service interface specification link, a combination of such links or any other suitable communications link.

The video streams and the forced advertisements, once transmitted through links 13 and 14, may then be received by user equipment 15. User equipment 15 may be implemented using a set-top box, a personal computer, a personal video recorder, or any other suitable equipment containing a processor or several processors. If desired, a combination of such arrangements may be used. Both the video streams and the forced advertisements may be shown to a user on a user display 16. The user display 16 may be integrated into the same enclosure as user equipment 15.

User equipment 15 may also include a storage device 17. Storage device 17 may be any suitable storage device such as a hard disk drive, a video tape drive, a rewritable compact disc or combination of such devices suitable for storing forced advertising. The storage device 17 may be capable of storing several hours of video streams (e.g., movies, television shows, sporting events, etc.) and forced advertisements (e.g., television commercials including video and audio, barker channel promotions, text, graphics, etc.).

Figure 2:
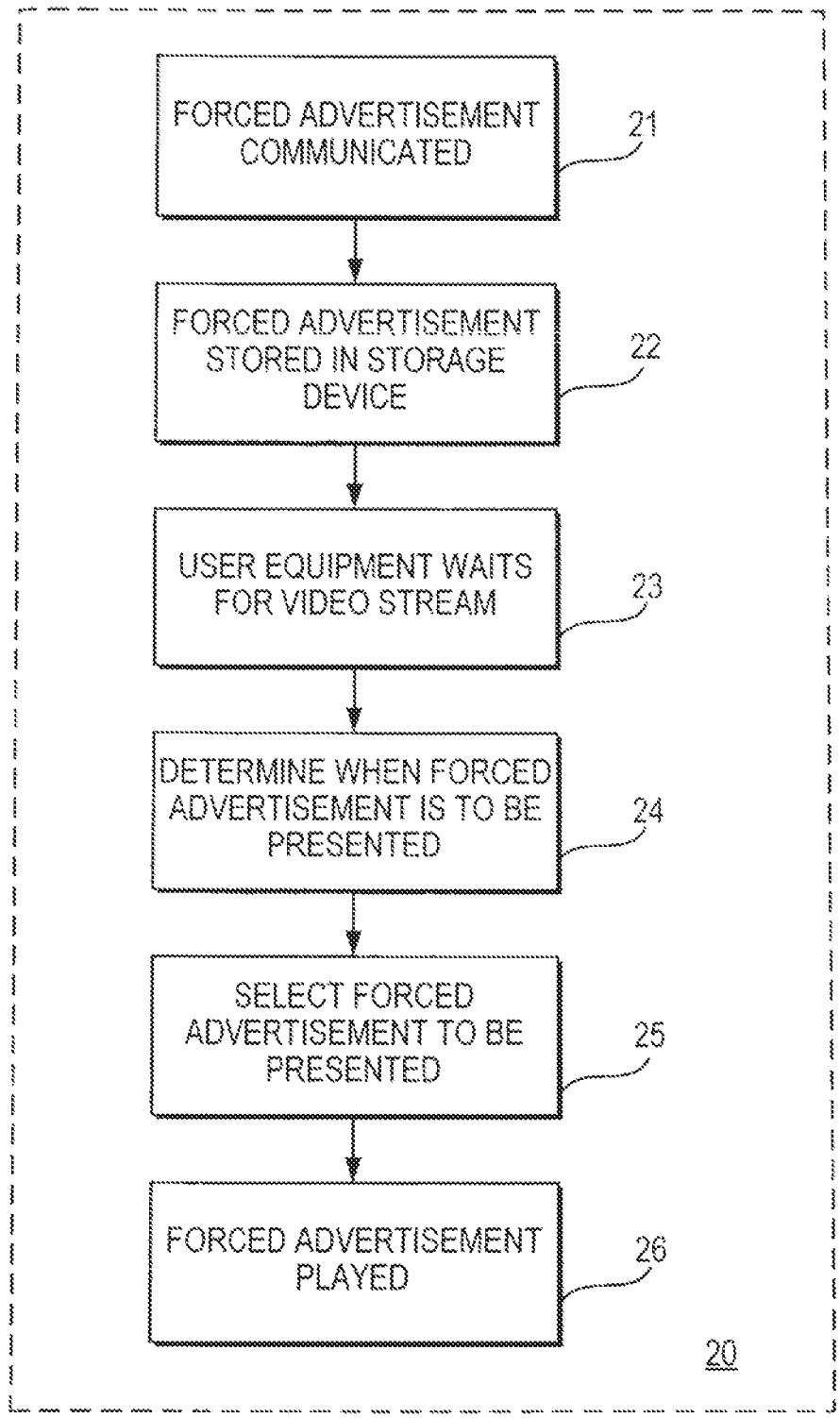
FIG. 2 is a flow chart of a process in accordance with one embodiment of the present invention in which a forced advertisement is retained in a storage device contained within user equipment.

One embodiment of a process 20 for forcing advertisements that may be implemented using system 10 is shown in FIG. 2. As illustrated, at step 21, a forced advertisement may be communicated from forced advertisement generation facility 12 to storage device 17 in user equipment 15 at times such as initial set-up of user equipment 15, when the user equipment 15 is turned on, at set time intervals, etc. The forced advertisement may then be stored in storage device 17 at step 22 for subsequent play. Next, at step 23, user equipment 15 may wait for a video stream to be presented to the television viewer. A video stream may be presented to a television viewer upon the viewer tuning to a desired television channel, for example. Once a video stream is being presented, process 20 may determine at step 24 whether a forced advertisement is to be presented.

Whether a forced advertisement is to be presented may be based upon any suitable factor or factors. For example, a forced advertisement may be presented Whenever a certain advertisement is included in the video stream—such as whenever a Pepsi advertisement is detected. Advertisements may be detected using programming tags or data, using close captioning data, or using any other suitable method. As another example, a forced advertisement may be presented at certain times within a broadcast—such as approximately 15 minutes into a program or during the third commercial break of a program. As still another example, a forced advertisement may be presented at a certain time or certain times of the day—such as at the top of each hour. Any other suitable method for selecting when and which advertisements are to be presented may be used.

In an alternative embodiment, the forced advertisement that is presented may be the same advertisement or a slightly modified version of the advertisement that is being replaced. For example, the forced advertisement may be for the same advertiser as the original advertisement or may be a version of the advertisement that has been determined to be of higher interest to the specific viewer or household.

Once a forced advertisement is determined to be presented at step 24, process 20 may next select which forced advertisement to be presented at step 25. Any suitable method for selecting which forced advertisement is to be presented may be used. For example, when certain advertisements are detected, a competitor advertisement may then be selected to be presented as the forced advertisement. Thus, when a Pepsi advertisement is detected, a Coca Cola advertisement may be forced. As another example, forced advertisements may be selected based upon program content that is broadcast near in time to the forced advertisement. Thus, when a forced advertisement is to be presented as the third advertisement of every television program, the forced advertisement may be for beer when presented during a football game and for golf clubs when presented during a golf tournament. The content of the program may be determined from program tags or guide data, from closed captioning data, ,or using any other suitable method.

Finally, once a forced advertisement is selected at step 25, the forced advertisement may be presented at step 26. Playing of the forced advertisement at step 26 may include preventing the television viewer from escaping the advertisement by switching channels, or even turning off the user equipment. For example, if the viewer attempts to switch to a different video stream channel during a forced advertisement (e.g., channel surfing), the user equipment may switch to the new channel but the forced advertisement may continue to play until completion or, alternatively, the advertisement play would have to be completed before the channel switch can occur. As another example, if the user turns off the user equipment 15 during the forced advertisement display, when the user turns the user equipment 15 back on, the forced advertisement may continue to be displayed until completion or it may replay from the beginning.

Forced advertisements may be presented at any point in a television program irrespective of whether another advertisement is being broadcast. To do this, a nearby television program may be buffered in storage device 17. For example, if a forced advertisement is to be presented at 7:15 pm during a television program, but no other advertisement is to be aired at that time, the invention may buffer the program while the forced advertisement is being presented, and then later remove a broadcast advertisement and unbuffer the program to make up the lost time.

Forced advertisements may be integrated into the video and/or audio of a television program broadcast or may be presented in a separate window. For example, a forced advertisement may be presented in a normal commercial break so that the television viewer has no idea that a forced advertisement is being presented. Alternatively, as another example, a forced advertisement may be presented in a window overlaying all or a portion of the television program broadcast.

Figure 3:
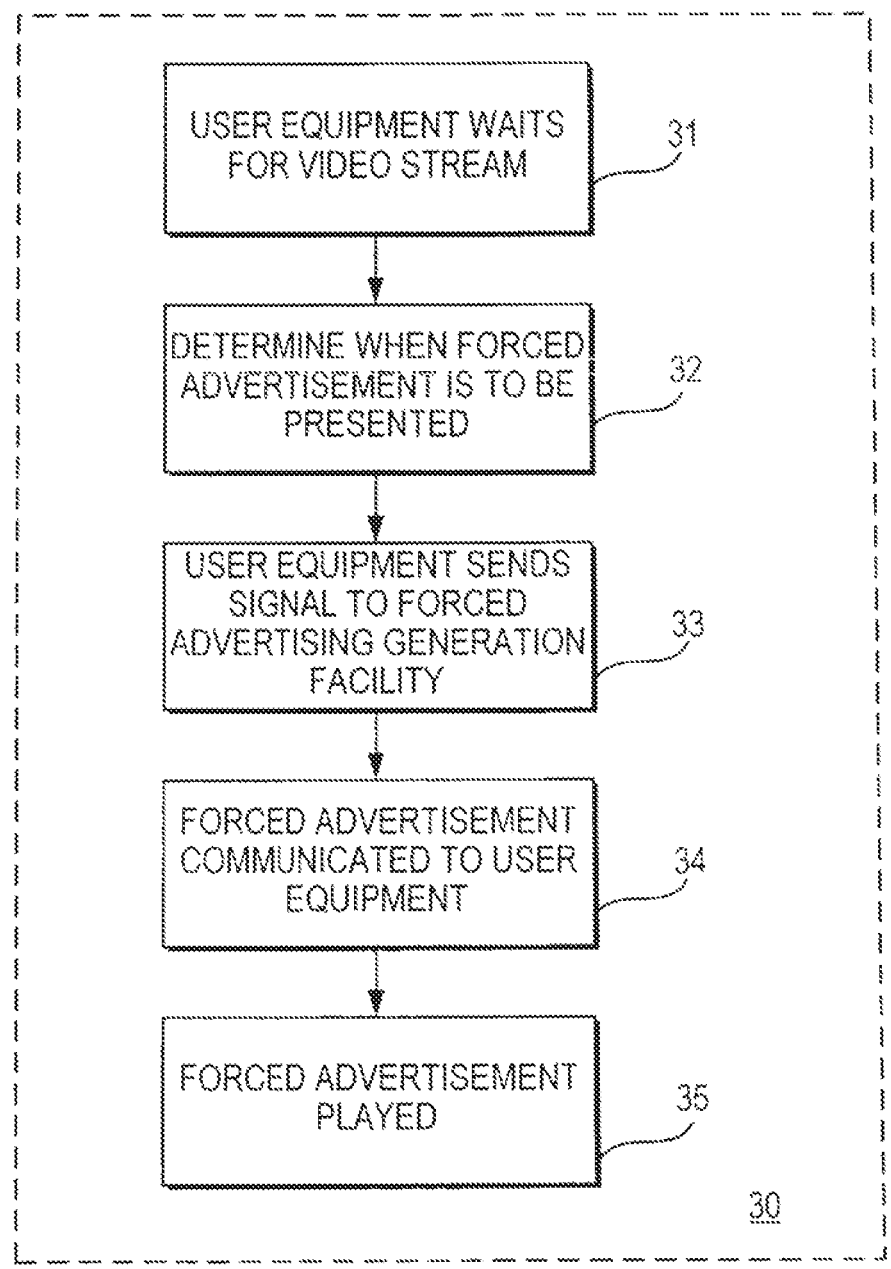
FIG. 3 is a flow chart of a process in accordance with one embodiment of the present invention in which a forced advertisement is transmitted from a forced advertising generation facility.

Turning to FIG. 3, another process 30 for forcing advertisements that may be implemented using user equipment 15 in accordance with one embodiment of the present invention is shown. As illustrated, at step 31, process 30 may wait for a video stream to be received. Step 31 may be substantially the same as step 23 described above. Next, at step 32, process 30 may determine when a forced advertisement is to be presented. Step 32 may be substantially the same as step 24 described above. At step 33, process 30 may then send a signal to forced advertisement generation facility 12 requesting that a forced advertisement be provided. Facility 12 may then select an advertisement to be presented in any suitable fashion, for example, as explained in connection with step 25 above. Then, at step 34, forced advertisement generation facility 12 may transmit a forced advertisement to user equipment 15. This forced advertisement may finally be presented at step 35. Step 35 may present the forced advertisement in substantially the same manner as described above in connection with step 26.

Figure 4:
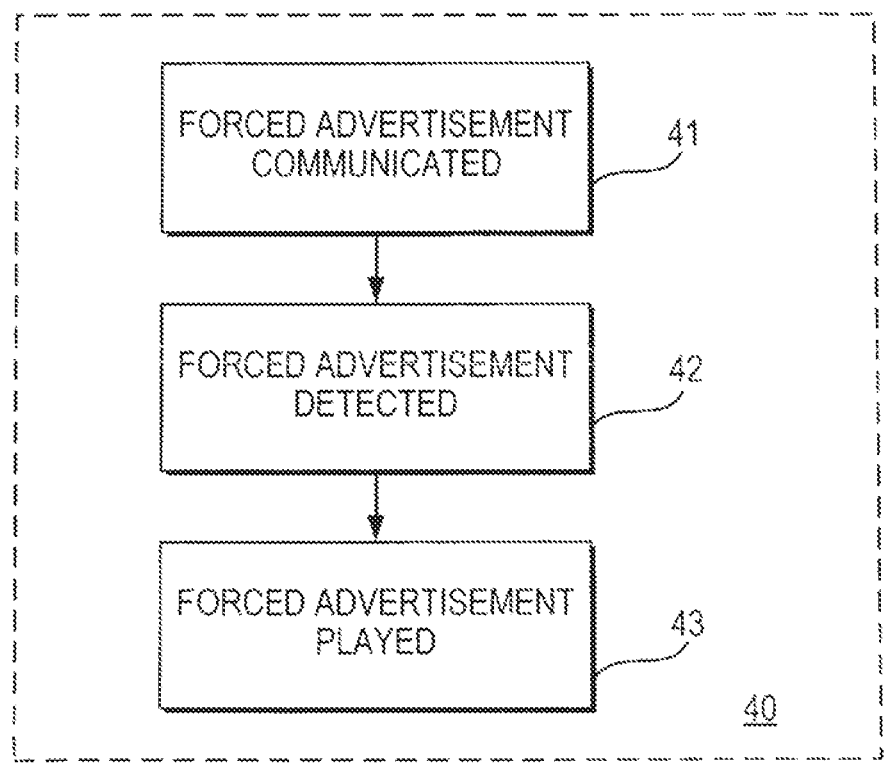
FIG. 4 is a flow chart of a process in accordance with one embodiment of the present invention in which an incoming advertisement is designated as a forced advertisement.

Turning to FIG. 4, another process 40 for detecting a forced advertisement in an incoming video stream for play or replay in accordance with one embodiment of the present invention is shown. As illustrated, at step 41, process 40 may wait for a video stream to be received. Next, at step 42, an incoming advertisement which has been designated as a forced advertisement may be received and identified. The identification may be based upon detecting designations in the forced advertisements, such as programming tags or data or close captioning data, may be based upon information stored in programming data, may be based upon a time at which an advertisement is received, may be based upon a channel on which an advertisement is received, etc., or any combination of the same. At step 43, the forced advertisement may then be played. Playing of the forced advertisement at step 43 may include preventing the television viewer from switching channels while the forced advertisement is playing. Additionally, at step 43, forced advertisements may be stored in the storage device 17 of user equipment 15, if desired. This may then allow the presentation of the forced advertisement in substantially the same manner as step 26, that is, the forced advertisement play may recommence or restart if the channel is switched or if the user equipment 15 is turned on and off.

In addition to providing forced advertising, user equipment 15 may also be used to present an electronic program guide. In one embodiment, the electronic program guide may be an interactive television program guide in order to facilitate selecting programs to be viewed. Illustrative interactive television program guides are described, for example, in Knee et al. U.S. Pat. No. 5,589,892, issued Dec. 31, 1996, and Knudson et al. U.S. patent application Ser. No. 09/357,941, filed Jul. 16, 1999, which are hereby incorporated by reference herein in their entireties.

Thus, it is apparent that there has been provided, in accordance with the invention, a forced advertising system that fully satisfies the objects, aims and advantages set forth above. While the invention has been described in conjunction with specific embodiments thereof, it is evident that many alternatives, modifications and variations as fall within the spirit of the appended claims.

What is claimed is:

1. A method for generating a display of alternate media content, the method comprising:
    generating a display of a video stream on a user equipment, wherein the video stream comprises an advertisement and a first video stream length;
    receiving an indication to generate a display of an alternate media content during said display of the video stream;
    interrupting said display of the video stream, wherein the video stream is buffered for a period of time required to fully play the alternate media content without stopping transmission of the video stream to the user equipment;
    generating a display of the alternate media content on the user equipment;
    removing the advertisement from the video stream to generate a second video stream length that is substantially the same as the first video stream length, wherein the advertisement occurs after displaying the alternate media content; and
    automatically unbuffering the video stream and reverting to generating a display of the video stream from the point of interruption.

2. The method of claim 1, wherein generating a display of the alternate media content comprises generating a display of the alternate media content as an overlay on the video stream.

3. The method of claim 1, wherein the advertisement is a first advertisement and the alternate media content is a second advertisement.

4. The method of claim 1, further comprising:
    receiving the video stream from a first media content source; and
    receiving the alternate media content from a second media content source that is different from the first media content source.

5. The method of claim 4, wherein the first media content source corresponds to a broadcaster of the video stream, and the second media content source corresponds to a distributor of the video stream.

6. The method of claim 1 further comprising disallowing a channel switch while the alternate media content is being displayed.

7. The method of claim 1, wherein the alternate media content is a modified version of at least a portion of the video stream.

8. The method of claim 7, wherein the modified version is selected based on a user profile of a viewer of the video stream.

9. The method of claim 1, further comprising storing the alternate media content on the user equipment.

10. The method of claim 1, wherein generating a display of the alternate media content comprises automatically generating a display of the alternate media content when the user equipment is turned on, if a previous display of the alternate media content was interrupted by turning off the user equipment.

11. The method of claim 1, wherein interrupting the video stream comprises interrupting the video stream during a scheduled advertisement slot for an advertisement included in the video stream.

12. The method of claim 1, further comprising selecting the alternate media content based on program content in the video stream.

13. The method of claim 1, wherein receiving an indication comprises detecting the inclusion in the video stream of an advertisement that belongs to a particular category.

14. The method of claim 1, wherein receiving an indication comprises detecting a signal in the video stream.

15. The method of claim 1, wherein receiving the indication comprises receiving an indication to generate a display of the alternate media content at a time that is relative to a length of program content in the video stream.

16. The method of claim 1, wherein receiving an indication comprises receiving an indication to generate a display of the alternate media content periodically.

17. The method of claim 1, wherein the advertisement is a first advertisement and the alternate media content comprises a second advertisement, and wherein the second advertisement is selected based at least in part on the first advertisement.

18. A system for generating a display of alternate media content, the system comprising a computer processor configured to:
    generate a display of a video stream on user equipment, wherein the video stream comprises an advertisement and a first video stream length;
    receive an indication to generate a display of an alternate media content during said display of the video stream;
    interrupt said display of the video stream, wherein the video stream is buffered for a period of time required to fully play the alternate media content without stopping transmission of the video stream to the user equipment;
    generate a display of the alternate media content on the user equipment;
    remove the advertisement from the video stream to generate a second video stream length that is substantially the same as the first video stream length, wherein the advertisement occurs after displaying the alternate media content; and
    automatically unbuffer the video stream and revert to generate a display of the video stream from the point of interruption.

19. The system of claim 18, wherein the processor is configured to generate a display of the alternate media content as an overlay on the video stream.

20. The system of claim 18, wherein the advertisement is a first advertisement and the alternate media content is a second advertisement.

21. The system of claim 18, wherein the processor is configured to disallow a channel switch while the alternate media content is being displayed.

22. The system of claim 18, wherein the alternate media content is a modified version of at least a portion of the video stream.

23. The system of claim 22, wherein the modified version is selected based on a user profile of a viewer of the video stream.

24. The system of claim 18, wherein the processor is configured to store the alternate media content on a storage device at the user equipment.

25. The system of claim 18, wherein the processor is configured to select the alternate media content based on program content in the video stream.

26. The system of claim 18, wherein the processor is configured to receive an indication by detecting the inclusion in the video stream of an advertisement that belongs to a particular category.

27. The system of claim 18, wherein the processor is configured to receive an indication by detecting a signal in the video stream.

28. The system of claim 18, wherein the processor is configured to receive the indication to generate a display of the alternate media content at a time that is relative to a length of program content in the video stream.

29. The system of claim 18, wherein the processor is configured to receive an indication to generate a display of the alternate media content periodically.

30. The system of claim 18, wherein the advertisement is a first advertisement and the alternate media content comprises a second advertisement, and wherein the second advertisement is selected based at least in part on the first advertisement.

\* \* \* \* \*